(12) United States Patent
Onodera et al.

(10) Patent No.: US 9,441,715 B2
(45) Date of Patent: Sep. 13, 2016

(54) MOVING MECHANISM AND FORM MEASURING APPARATUS

(71) Applicant: MITUTOYO CORPORATION, Kanagawa (JP)

(72) Inventors: Youhei Onodera, Kure (JP); Hideki Shindo, Kure (JP); Naoki Izumi, Kure (JP)

(73) Assignee: MITUTOYO CORPORATION, Kanagawa (JP)

( * ) Notice: Subject to any disclaimer, the term of this patent is extended or adjusted under 35 U.S.C. 154(b) by 207 days.

(21) Appl. No.: 14/487,380

(22) Filed: Sep. 16, 2014

(65) Prior Publication Data

US 2015/0082926 A1 Mar. 26, 2015

(30) Foreign Application Priority Data

Sep. 24, 2013 (JP) ................................. 2013-197317

(51) Int. Cl.
| | |
|---|---|
| *F16H 25/12* | (2006.01) |
| *F16D 13/10* | (2006.01) |
| *G01B 5/00* | (2006.01) |
| *G01B 5/20* | (2006.01) |
| *F16H 19/02* | (2006.01) |

(52) U.S. Cl.
CPC .............. *F16H 25/12* (2013.01); *F16D 13/10* (2013.01); *F16H 19/025* (2013.01); *G01B 5/0002* (2013.01); *G01B 5/0004* (2013.01); *G01B 5/20* (2013.01); *Y10T 74/18696* (2015.01)

(58) Field of Classification Search
CPC ...... F16D 13/10; F16H 25/12; F16H 19/025; G01B 5/0002; G01B 5/20; G01B 5/0004; Y10T 74/18696

USPC ................. 33/550–551, 502–503, 553–554, 33/556–557, 560; 74/89.38
See application file for complete search history.

(56) References Cited

U.S. PATENT DOCUMENTS

| | | | | |
|---|---|---|---|---|
| 4,777,818 A | * | 10/1988 | McMurtry | G01B 3/30 33/503 |
| 5,724,745 A | * | 3/1998 | Brenner | G05B 19/4207 33/1 M |
| 6,327,788 B1 | * | 12/2001 | Seddon | G01B 5/201 33/543 |
| 6,543,150 B2 | * | 4/2003 | Matsumiya | G01B 7/012 33/503 |
| 6,625,894 B1 | * | 9/2003 | Kovach | B23Q 17/2216 33/201 |
| 6,729,036 B2 | * | 5/2004 | Denzel | G01B 7/003 33/706 |

(Continued)

FOREIGN PATENT DOCUMENTS

| | | |
|---|---|---|
| JP | 2539998 | 10/1996 |
| JP | 5049514 | 10/2012 |
| JP | 5235039 | 7/2013 |

*Primary Examiner* — R. A. Smith
*Assistant Examiner* — Tania Courson
(74) *Attorney, Agent, or Firm* — Greenblum & Bernstein, P.L.C.

(57) ABSTRACT

A traction nut has twist rollers pivotally supported so as to be rotatable in a state of defining an inclination angle with respect to an axis of a drive shaft, the inclination angle being equivalent to a lead angle; an open/close lever provided to switch between a friction-contact state and a disengaged state of the traction nut relative to the drive shaft; and a spring generating a biasing force such that the traction nut is brought into friction-contact with the drive shaft. In response to user operation, the open/close lever puts the traction nut in the disengaged state against the biasing force of the spring. When the user releases the open/close lever, the traction nut returns to the friction-contact state due to the biasing force of the spring.

6 Claims, 10 Drawing Sheets

(56) References Cited

U.S. PATENT DOCUMENTS 8,065,812 B2 * 11/2011 Zhang ..................... G01B 3/22
33/533

2001/0008047 A1 * 7/2001 Okada .................... G01B 5/008
33/503
2001/0034948 A1 * 11/2001 Matsumiya ............ G01B 7/012
33/553

* cited by examiner

PRIOR ART

§ 119 of Japanese Application No. 2013-197317 filed on Sep. 24, 2013, the disclosure of which is expressly incorporated by reference herein in its entirety.

MOVING MECHANISM AND FORM MEASURING APPARATUS

CROSS-REFERENCE TO RELATED APPLICATIONS

The present application claims priority under 35 U.S.C. § 119 of Japanese Application No. 2013-197317 filed on Sep. 24, 2013, the disclosure of which is expressly incorporated by reference herein in its entirety.

BACKGROUND OF THE INVENTION

1. Field of the Invention

The present invention relates to a moving mechanism, for example, a moving mechanism that moves a form measurer.

2. Description of Related Art

Figure 13:
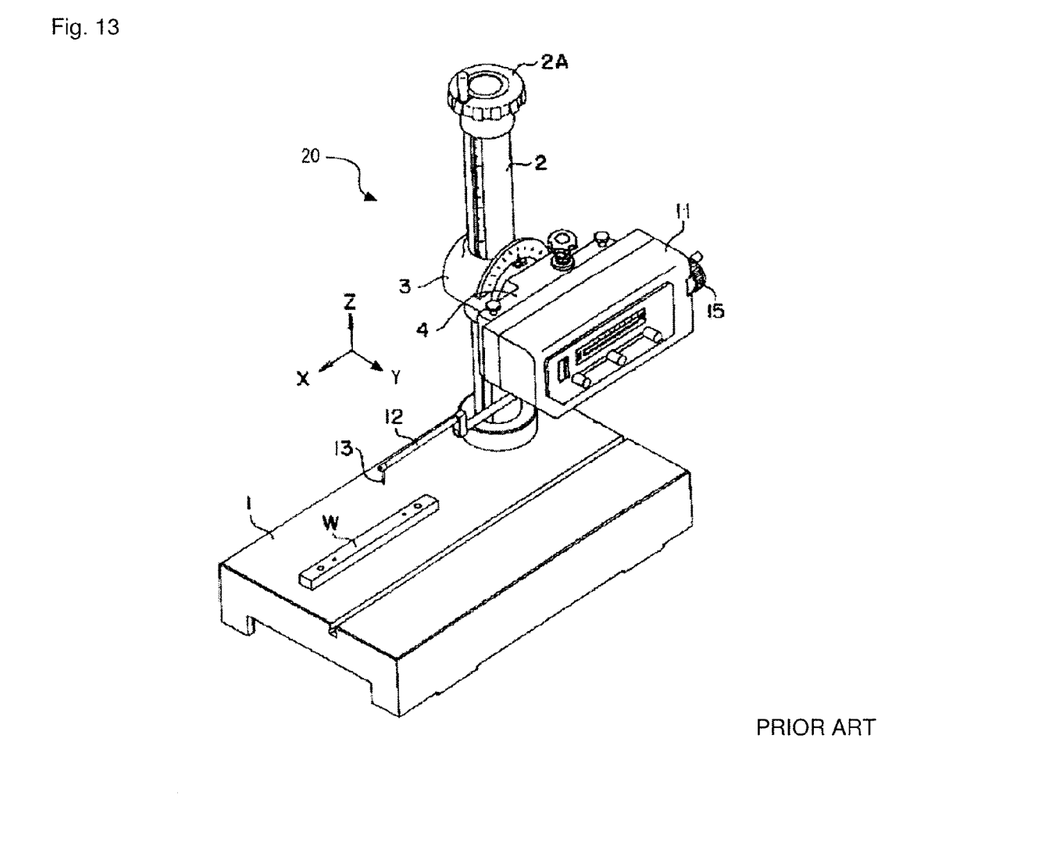
FIG. 13 illustrates a form measuring apparatus as prior art.

An apparatus shown in FIG. 13 is known, for example, as a form measuring apparatus 20 measuring a profile shape of a measured object W (Japanese Patent No. 2539998). A support pillar 2 stands on a base 1. A moving screw is rotatably provided inside the support pillar 2. An operation handle 2A is provided at an upper end of the moving screw (the moving screw is hidden inside the support pillar and thus invisible in FIG. 13). A lift member 3 is provided to the support pillar 2 so as to be movable upward and downward. A nut fixated to the lift member 3 is threaded together with the moving screw. Thus, rotation of the moving screw raises and lowers the nut and the lift member 3 (the nut is hidden inside the lift member 3 and thus invisible in FIG. 13).

A form measurer 11 is provided to the lift member 3 via a swing member 4. The swing member 4 is angle-adjustable with reference to a swing axis, which is an axis orthogonal to an axis of the support pillar 2. The form measurer 11 swingably supports a measuring arm 12 and electrically detects a swing amount of the measuring arm 12. A stylus 13 projects from a fore end of the measuring arm 12, the stylus 13 moving along a surface profile of the measured object W.

For measurement, the measured object W is placed on the base 1 and the stylus 13 is positioned at a measurement start point of the measured object W. At this time, the form measurer 11 needs to be adjusted to be positioned such that the stylus 13 is positioned slightly higher than a height of a measured surface of the measured object W. Then, a user rotates the operation handle 2A to raise and lower the lift member 3 by way of screw movement.

Since fine positioning is required for the form measuring apparatus 20, a screw lead of the moving screw is designed to be fine. This is beneficial to enable fine positioning; however, a circumstance concurrently arises where a movement amount per rotation of the operation handle 2A is extremely limited. Given that the form measurer 11 needs to be moved substantially every time the measured object W is replaced, positioning of the form measurer 11 requires a substantial amount of time.

In view of the above, the inventors of the present application have already devised a moving mechanism using twist rollers, instead of screw movement (Japanese Patent Nos. 5049514 and 5235039).

The moving mechanism disclosed in Japanese Patent Nos. 5049514 and 5235039 has a plurality of twist rollers capable of making contact with and separating from a drive shaft. A collet holding and releasing the drive shaft is provided to pivotally support the twist rollers. When the collet holds the drive shaft, the twist rollers come into contact with the drive shaft. When the collet releases the drive shaft, the twist rollers separate from the drive shaft. Expansion and contraction of the collet is controlled by a cam. Specifically, a cam having an elliptical shape in cross section is inserted to the collet. Rotating the cam changes a gap of the collet. Rotating the drive shaft in a state where the twist rollers are in contact with the drive shaft allows advancement and retraction by an amount of a twist angle of the twist rollers. In other words, fine movement is achieved. Meanwhile, in a state where the twist rollers are separated from the drive shaft, the collet is free and thus high-speed movement (rough movement) is enabled. With a moving body, such as a form measurer, provided to the collet, for example, switching between fine movement and rough movement of the form measurer (moving body) is enabled.

The configurations of Japanese Patent Nos. 5049514 and 5235039 reliably allow high-speed movement (rough movement) and fine positioning (fine movement). However, the configurations slightly lack in operability. In the configurations of Japanese Patent Nos. 5049514 and 5235039, for example, the cam needs to be rotated every time the fine movement and the rough movement are switched. When the fine movement and the rough movement are switched repeatedly to adjust positioning of the form measurer (moving body), it is cumbersome to operate the cam every time.

In addition, a practical circumstance as below arises. For example, the cam is rotated to separate the twist rollers from the drive shaft. At this time, the collet is free and thus the high-speed movement (rough movement) is enabled. However, when the user's hand is removed, the collet may operate in a manner not intended by the user. This circumstance is not notable in horizontal movement as described in Japanese Patent Nos. 5049514 and 5235039. In a vertically moving mechanism, however, in which a drive shaft is provided vertically, a collet may drop together with a form measurer (moving body). Thus, the user needs to support the form measurer (moving body) with one hand and then rotate the cam with the other hand to bring the twist rollers into contact with the drive shaft. Such an operation is very cumbersome and requires the user to perform in an unnatural manner.

Such a circumstance is not limited to the form measurer and is common to a moving mechanism that requires fine positioning and is sometimes required to make a large movement as well.

SUMMARY OF THE INVENTION

In view of the conventional circumstances above, the present invention provides a moving mechanism capable of switching between rough movement and fine movement and having excellent operability.

An aspect of the present invention provides a moving mechanism including a drive shaft rotatable around an axis and a traction nut portion (also referred to as a "traction nut") provided so as to hold therebetween the drive shaft in a direction orthogonal to the axis of the drive shaft, the traction nut portion being capable of switching between a friction-contact state of being in friction-contact with the drive shaft and a disengaged state of being disengaged from the drive shaft. The traction nut portion includes twist rollers pivotally supported so as to be rotatable in a state of defining an inclination angle with respect to the axis of the drive shaft, the inclination angle being equivalent to a lead angle; an open/close lever provided to switch between the friction-contact state and the disengaged state of the traction nut portion; and a biasing tool generating a biasing force such that the traction nut portion is brought into friction-contact with the drive shaft. When the drive shaft is rotated in a state where the traction nut portion is in friction-contact with the drive shaft, the traction nut portion makes fine movement along the drive shaft depending on the lead angle. In a state where the traction nut portion is disengaged from the drive shaft, the traction nut portion freely makes rough movement along the drive shaft. In response to user operation, the open/close lever puts the traction nut portion in the disengaged state against the biasing force of the biasing tool. When the user releases the open/close lever, the traction nut portion returns to the friction-contact state due to the biasing force of the biasing tool.

In the present invention, the traction nut portion preferably further includes a stationary piece and a movable piece, the stationary piece and movable piece being provided opposite to each other having the drive shaft therebetween in the direction orthogonal to the axis of the drive shaft. First ends of the stationary piece and the movable piece are preferably connected so as to be elastically deformable and a second end of the movable piece is preferably biased by the biasing tool so as to approach the stationary piece. The open/close lever is preferably pivotally supported so as to be swingable by the stationary piece. The open/close lever preferably has on a fore end thereof a push pin pressing the second end of the movable piece in a direction away from the stationary piece.

In the present invention, the traction nut portion preferably further includes a handle extending in the direction substantially orthogonal to the axis of the drive shaft and being fixed relative to the traction nut portion. The open/close lever and the handle preferably have a close positional relationship and are provided in parallel to each other. When the user grasps the handle, the open/close lever is preferably concurrently grasped. When the user releases the handle, the open/close lever is preferably concurrently released from a hand of the user.

In the present invention, the handle preferably has a groove capable of receiving the open/close lever.

In the present invention, the drive shaft is preferably provided in an up/down direction and the traction nut portion preferably advances and retracts in the up/down direction along the drive shaft.

Another aspect of the present invention provides a form measuring apparatus including the moving mechanism and a form measurer provided to the traction nut portion.

Furthermore, the form measuring apparatus preferably includes a rotary switch as an operation switch to advance and retract a measuring arm in an X-axis direction. Specifically, the form measuring apparatus preferably includes the rotary switch as the operation switch to supply a drive signal to a motor that advances and retracts the measuring arm. The rotary switch preferably includes a jog and a shuttle rotatable independently from each other and being concentric. When the jog is rotated, a predetermined number of motor pulses per predetermined angle is preferably supplied to the motor. When the shuttle is rotated, a drive signal increasing and decreasing depending on a rotation angle from a predetermined position is preferably supplied to the motor.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

Figure 1:
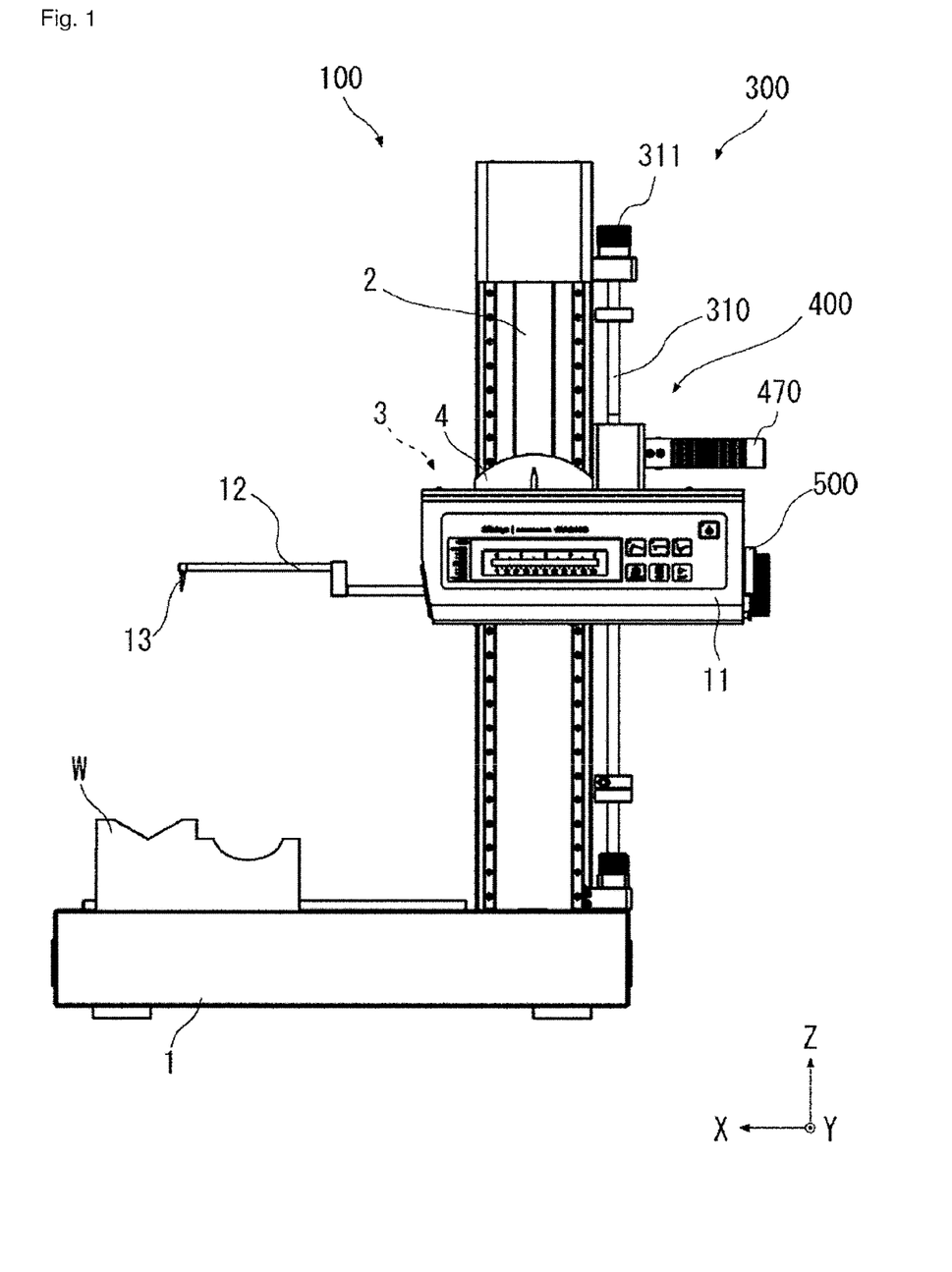
FIG. 1 is a front view of a form measuring apparatus according to a first embodiment.
Figure 2:
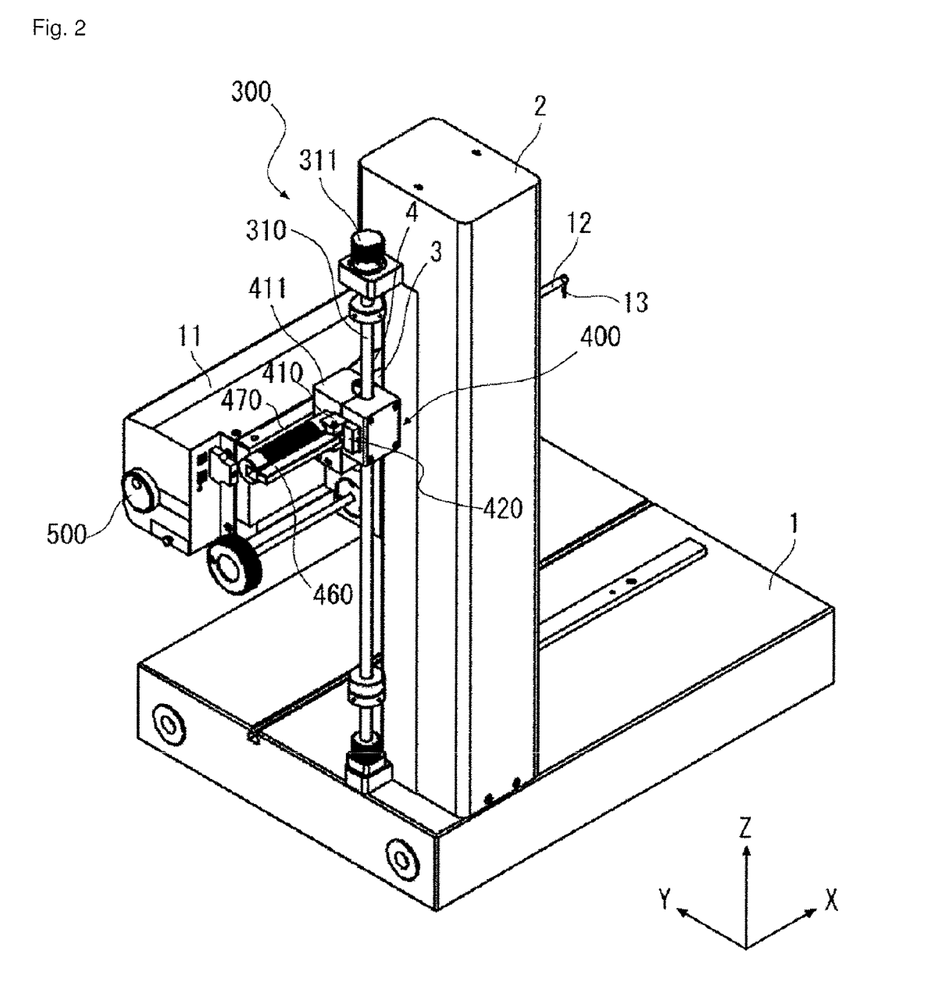
FIG. 2 is a rear perspective view of the form measuring apparatus.

Embodiments according to the present invention are illustrated in the drawings and are described with reference to reference numerals assigned to elements in the drawings. FIG. 1 is a front view of a form measuring apparatus according to a first embodiment. FIG. 2 is a rear perspective view of the form measuring apparatus. The form measuring apparatus has a base 1, a support pillar 2, a lift member 3, a swing member 4, a form measurer 11, and a moving mechanism 300.

Figure 3:
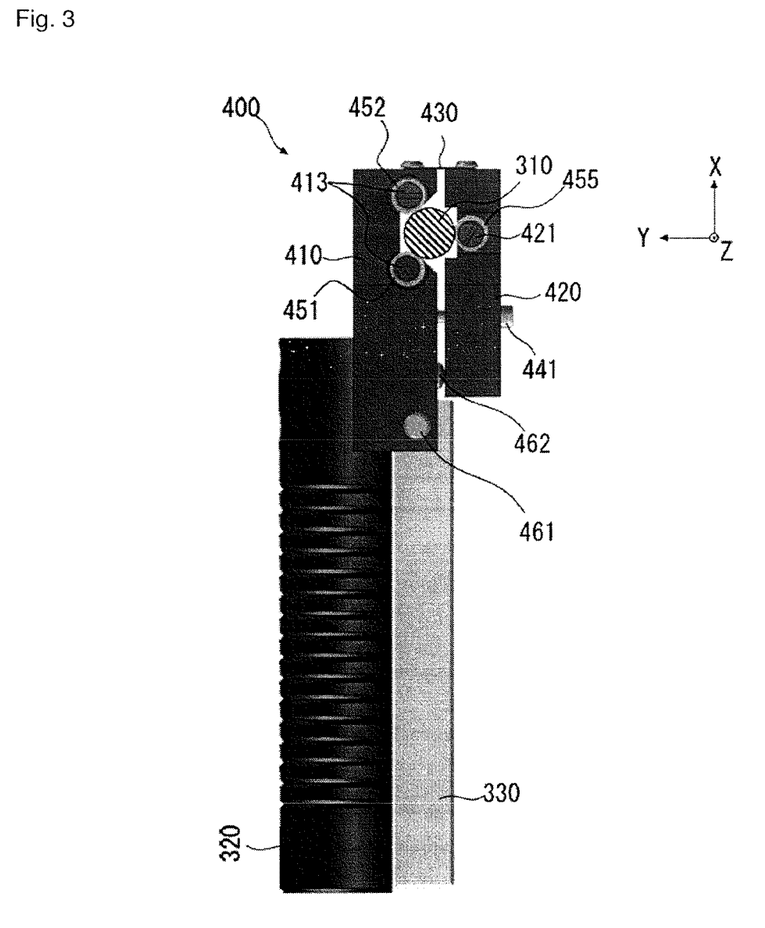
FIG. 3 is a cross-sectional view of a drive shaft to illustrate a moving mechanism along an axis of the drive shaft.
Figure 4:
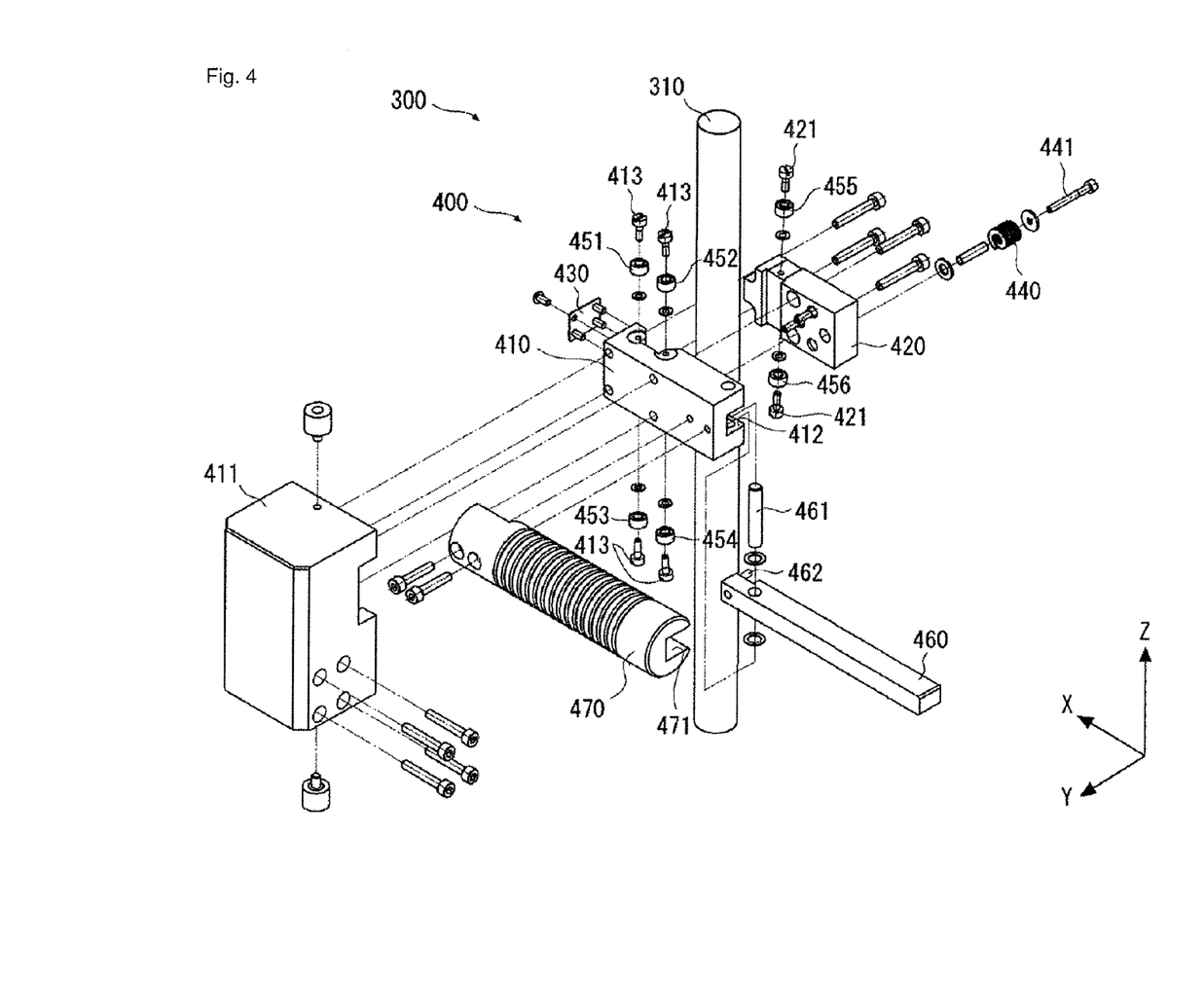
FIG. 4 is an exploded perspective view of the moving mechanism.

Except for the moving mechanism 300, an existing configuration (for example, Japanese Patent No. 2539998) can be used for the base 1, the support pillar 2, the lift member 3, the swing member 4, and the form measurer 11. Thus, the moving mechanism 300 is primarily described below. To facilitate description, X-axis, Y-axis, and Z-axis directions are defined as shown in FIGS. 1 and 2. Specifically, a height direction is defined as the Z-axis direction; a right/left direction in FIG. 1 is defined as the X-axis direction; and a depth direction in FIG. 1 is defined as the Y-axis direction. FIG. 3 is a cross-sectional view of a drive shaft 310 to illustrate the moving mechanism 300 along an axis of the drive shaft 310. FIG. 4 is an exploded perspective view of the moving mechanism 300. The moving mechanism 300 has the drive shaft 310 and a traction nut portion 400.

The drive shaft 310 stands on the base 1 so as to be parallel with the support pillar 2. The drive shaft 310 can be rotated with a knob 311 provided at an upper end of the drive shaft 310.

The traction nut portion 400 is provided so as to be capable of tightening and loosening on the drive shaft 310. Specifically, the traction nut portion 400 is normally friction-engaged with the drive shaft 310. When a user operates a lever, the traction nut portion 400 is loosened and disengaged from the drive shaft 310. The traction nut portion 400 has a stationary piece 410, a movable piece 420, a hinge 430, a spring 440, six twist rollers 451 to 456, an open/close lever 460, and a handle 470.

With reference to FIGS. 3 and 4, the stationary piece 410 and the movable piece 420 hold the drive shaft 310 therebetween so as to be capable of tightening and loosening thereon. The stationary piece 410 and the movable piece 420 are each a member extending in the X-axis direction with respect to the drive shaft 310 standing in the Z-axis direction. The stationary piece 410 on a +Y side and the movable piece 420 on a −Y side have the drive shaft 310 therebetween. The stationary piece 410 and the movable piece 420 are connected by the hinge 430 on an end surface on a +X side. The hinge 430 is a thin plate having a certain elasticity. Thus, the stationary piece 410 and the movable piece 420 can be opened and closed slightly like a hinge.

A bracket 411 is attached to the stationary piece 410. The bracket 411 is then connected to the lift member 3. Thus, the stationary piece 410 is integrated with the lift member 3 via the bracket 411.

The stationary piece 410 has a groove 412 in an end portion on an opposite side from the hinge 430. The groove 412 is provided to the stationary piece 410 in a surface thereof opposite to the movable piece 420. The groove 412 has a predetermined length in the X-axis direction. The groove 412 allows the open/close lever 460 to be attached.

In the traction nut portion 400, the spring 440 is provided in an end portion on the opposite side from the hinge 430 with the drive shaft 310 therebetween. The spring 440 herein is a coil spring, but may be any elastic body generating a biasing force. The spring 440 is pressed against the movable piece 420 from the −Y side, specifically, the opposite side from the stationary piece 410. A screw 441 is provided so as to be inserted through the spring 440 and the movable piece 420. A fore end portion of the screw 441 is threaded together with the stationary piece 410. Thus, the movable piece 420 is pressed toward the stationary piece 410 by the biasing force of the spring 440.

In a configuration herein, the movable piece 420 is pressed toward the stationary piece 410. Alternatively, the movable piece 420 may be pulled toward the stationary piece 410.

Figure 5:
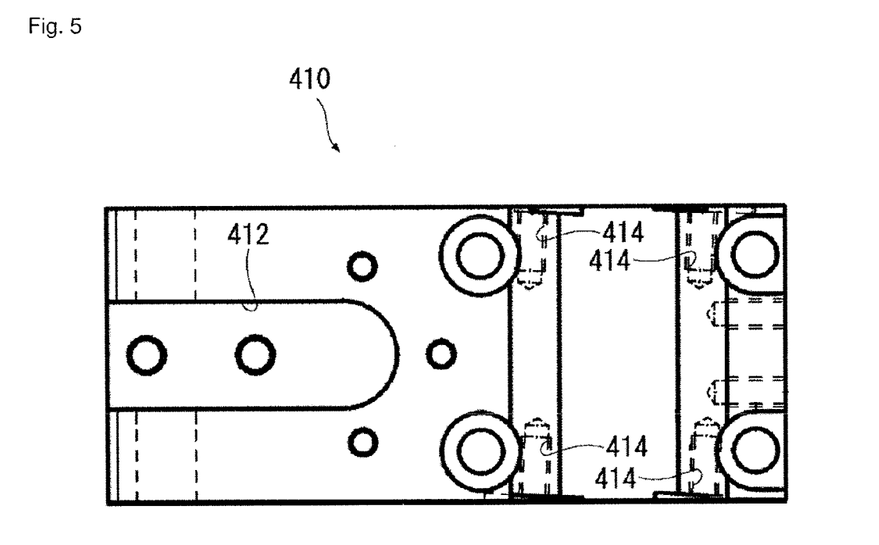
FIG. 5 is an end-sectional view of a stationary piece viewed from a −Y side.

The six twist rollers 451 to 456 are provided. Of the six twist rollers 451 to 456, the four twist rollers 451 to 454 are supported in the stationary piece 410 while the remaining two twist rollers 455 and 456 are supported in the movable piece 420. Of the four twist rollers 451 to 454 in the stationary piece 410, the two twist rollers 451 and 452 are provided on an upper surface of the stationary piece 410 while the two twist rollers 453 and 454 are provided on a lower surface of the stationary piece 410. The four twist rollers 451 to 454 are rotatably supported in the stationary piece 410 by screw pins 413. With reference to FIG. 5, axes of screw holes 414 of the stationary piece 410 are inclined. FIG. 5 is an end-sectional view of the stationary piece 410 viewed from the −Y side.

Figure 6:
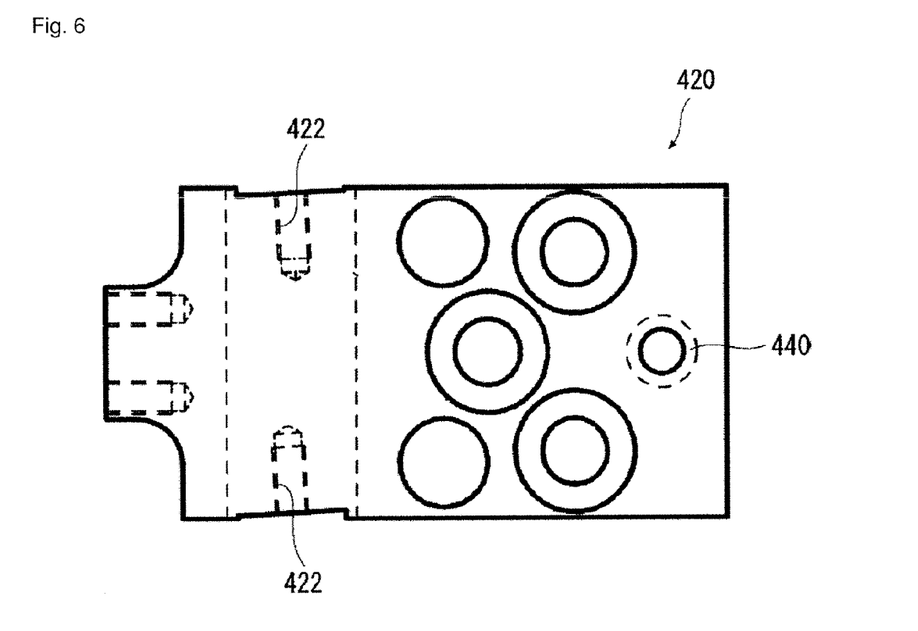
FIG. 6 is an end-sectional view of a movable piece viewed from a +Y side.
Figure 7:
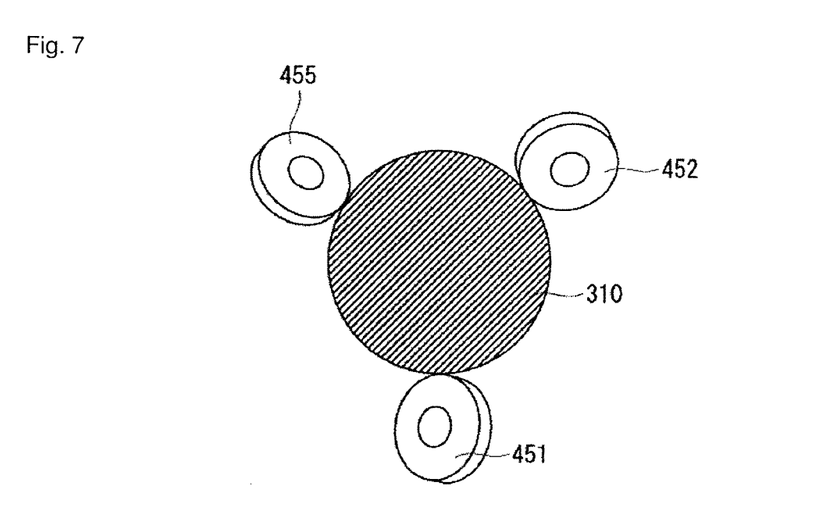
FIG. 7 illustrates the drive shaft and twist rollers alone viewed from the axis direction of the drive shaft.
Figure 8:
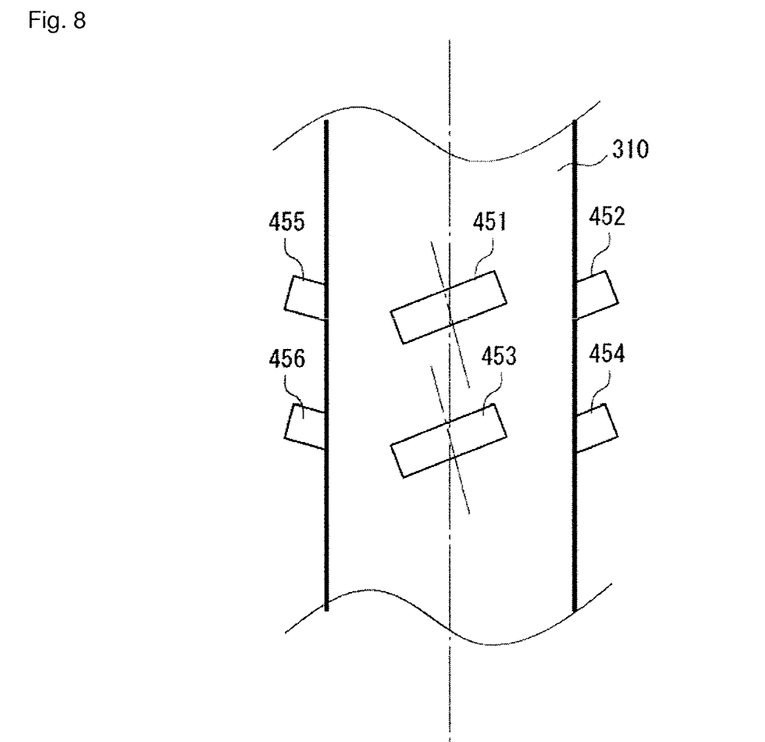
FIG. 8 is a side view of the drive shaft and twist rollers alone.

Similarly, the two twist rollers 455 and 456 are supported in the movable piece 420 by screw pins 421. Axes of screw holes 422 of the movable piece 420 are inclined, as shown in FIG. 6. FIG. 6 is an end-sectional view of the movable piece 420 viewed from the +Y side. With reference to FIGS. 7 and 8, the twist rollers 451 to 456 are each inclined at a predetermined angle with respect to the drive shaft 310. FIG. 7 illustrates the drive shaft 310 and the twist rollers 451, 452, and 455 alone viewed from the axis direction of the drive shaft 310. FIG. 8 is a side view of the drive shaft 310 and the twist rollers 451 to 456 alone.

The twist rollers 451 to 454 in the stationary piece 410 are inclined in a direction opposite to that of the twist rollers 455 and 456 in the movable piece 420. The inclinations of the twist rollers 451 to 456 in the movable piece 420 generate a lead. When the drive shaft 310 rotates in a state where the twist rollers 451 to 456 having the inclined rotation axes are in contact with the drive shaft 310, the traction nut portion 400 advances and retracts in the axis direction of the drive shaft 310.

The open/close lever 460 extends in the X-axis direction. A fore end portion thereof is loosely inserted to the groove 412 of the stationary piece 410. The open/close lever 460 is pivotally supported so as to be swingable by a rod 461. The rod 461 is provided in the Z-axis direction, and thus the open/close lever 460 is swingable in the Y-axis direction within an XY plane. A push pin 462 projects from the fore end portion of the open/close lever 460 in a direction from the stationary piece 410 toward the movable piece 420. Since the movable piece 420 is pressed toward the stationary piece 410 by the spring 440, the push pin 462 is normally pressed toward the stationary piece 410 by the movable piece 420.

Figure 9:
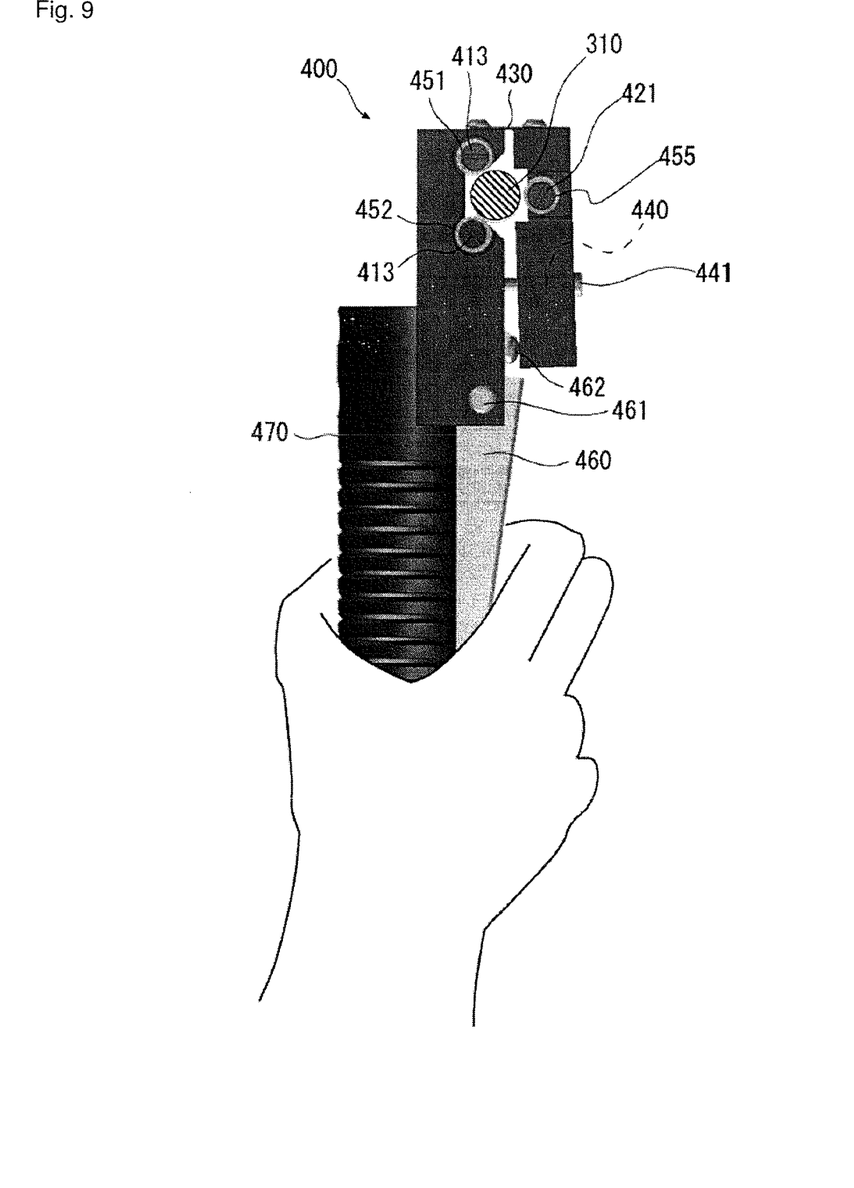
FIG. 9 illustrates a state where a handle and an open/close lever are held.

When a base end portion of the open/close lever 460 is swung to the +Y side, the push pin 462 moves to the −Y side. Specifically, the movable piece 420 can be pressed in a direction away from the stationary piece 410 by the swing of the open/close lever 460. When the movable piece 420 disengages from the stationary piece 410, the twist rollers 451 to 456 disengage from the drive shaft 310 accordingly, as shown in FIG. 9. In this state, the traction nut portion 400 is disengaged from the drive shaft 310, and thus the traction nut portion 400 is free and movable.

With reference to FIGS. 2 and 4, the handle 470 extends in the X-axis direction. The handle 470 is fixated to the stationary piece 410. The handle 470 has a groove 471 along an axis thereof. The groove 471 has a width approximately capable of receiving the open/close lever 460.

The handle 470 and the open/close lever 460 have a positional relationship substantially parallel to each other such that when a user grasps the handle 470, the user naturally grasps the open/close lever 460 as well. When the open/close lever 460 is grasped together with the handle 470, the open/close lever 460 is received in the groove 321 of the handle 470. This allows the open/close lever 460 to swing as well as facilitates grasping of the open/close lever 460 and the handle 470 together.

Thus, when the user grasps the handle 470, the user also grasps the open/close lever 460 together with the handle 470. At this time, the push pin 462 of the open/close lever 460 presses the movable piece 420. Then, the traction nut portion 400 is disengaged and free from the drive shaft 310. Thus, grasping the handle 470 automatically frees the traction nut portion 400 without particular awareness on the part of the user. Accordingly, the user only has to hold the handle 470 and move the lift member 3 in the Z-axis direction.

Meanwhile, when the user releases the handle 470, the open/close lever 460 is also released from the user's hand. At this time, the movable piece 420 approaches the stationary piece 410 due to the biasing force of the spring 440. Then, the twist rollers 451 to 456 come into contact with the drive shaft 310, causing friction between the traction nut portion 400 and the drive shaft 310. Thus, when the user releases the handle 470, a position of the traction nut portion 400 (specifically, a position of the lift member 3) is fixed.

An actual procedure of use is simply described. When a workpiece W is replaced, the stylus 13 is positioned at a measurement start point of the measured object W. At this time, the form measurer 11 is adjusted so as to be positioned slightly higher than the workpiece W. For adjustment, the user holds the handle 470 and moves the traction nut portion 400 (specifically, the lift member 3) in the Z-axis direction. As described above, holding the handle 470 automatically enables the traction nut portion 400 to move freely.

When the form measurer 11 is positioned at approximately a desired height, the user stops the handle 470 and releases the hand therefrom. Then, the faun measurer 11 stays at the position. The user then moves the hand that grasped the handle 470 to the knob 311 at the upper end of the drive shaft 310. The user rotates the knob 311 to rotate the drive shaft 310. Thus, the traction nut portion 400 (specifically, the lift member 3) moves upward and downward due to the inclinations of the twist rollers 451 to 456.

Thus, the present embodiment provides the moving mechanism 300 capable of switching between rough movement and fine movement and having excellent operability.

Modified Example 1

The moving mechanism 300 preferably further has a counterbalance. When the user grasps the handle 470 and attempts to pull it upward, the user may exert excessive force and thus the form measurer 11 moves swiftly and largely. Furthermore, when the user attempts to pull the handle 470 downward, the form measurer 11 may drop unless it is securely supported. Thus, providing the counterbalance is preferred. To provide the counterbalance, one pulley, a wire, and a balance weight are prepared. The pulley is provided at the upper end of the support pillar 2, for example. One end of the wire placed around the pulley is connected to the lift member 3, and the other end of the wire is connected to the balance weight. Thereby, without feeling the weight of the form measurer 11, the user does not need to apply force to move the form measurer 11 upward and downward. Accordingly, the form measurer 11 does not move swiftly and largely, or drop.

Second Embodiment

Figure 10:
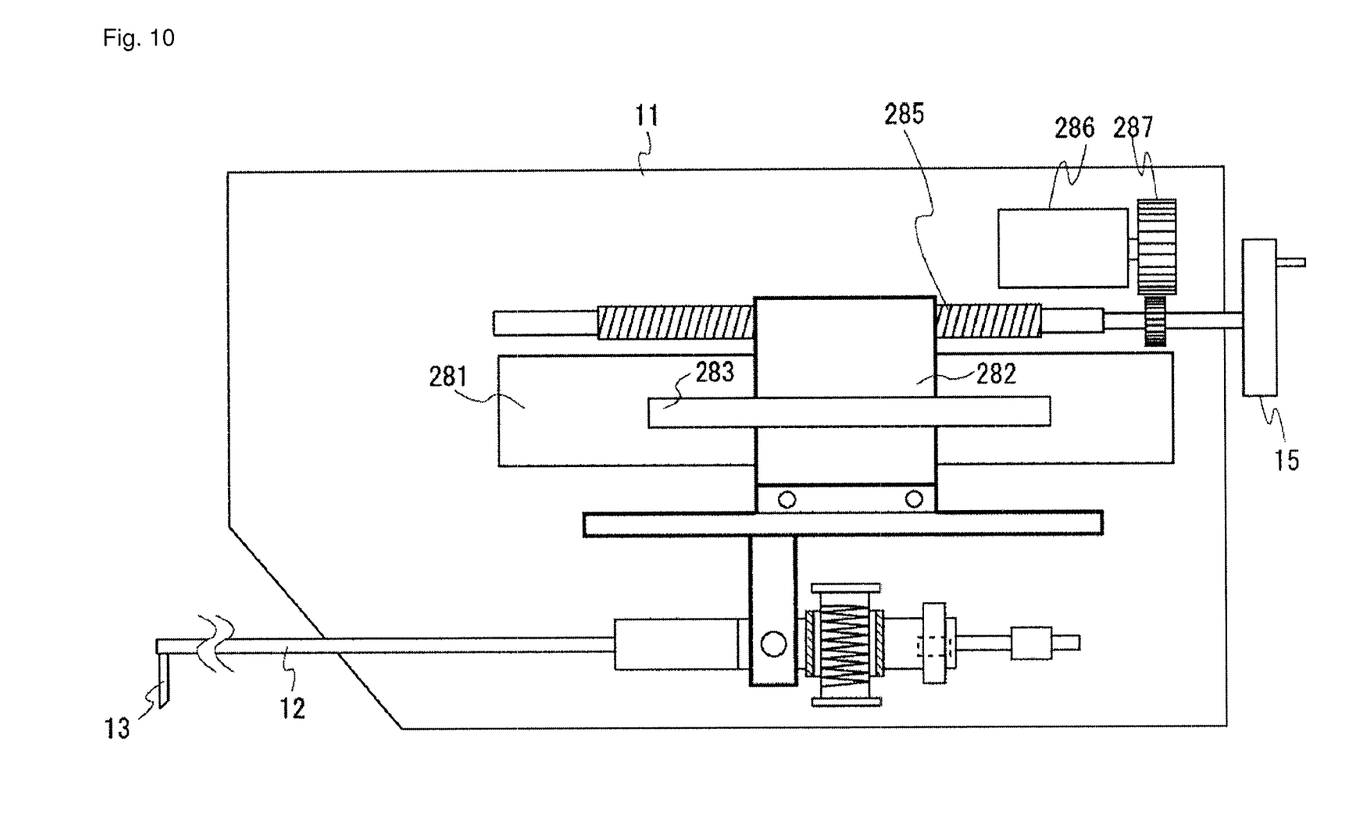
FIG. 10 illustrates an internal mechanism of a form measurer.

An X-axis direction position adjustment mechanism is described according to a second embodiment. A form measuring apparatus 100 has an X-axis drive mechanism moving a measuring arm 12 in the X-axis direction. FIG. 10 illustrates an internal mechanism of a form measurer 11. An X slider 282 is threaded together with a moving screw 285 provided in the X direction. The measuring arm 12 is swingably supported by the X slider 282. The X slider 282 is guided by a guide rail 281. A displacement amount of the X slider 282 is detected by an X-direction position detector 283 (encoder, for example).

Rotary power of a motor 286 is transmitted to the moving screw 285 via a gear 287. A user can drive the motor 286 by operating a PC (personal computer) or a remote controller. For fine position adjustment, a rotary handle 15 is provided. The rotary handle 15 is provided in the rear end of the form measurer 11 and is connected to the moving screw 285. When the user rotates the rotary handle 15, the moving screw 285 also rotates similarly, thus allowing fine adjustment in the X direction. The measuring arm 12 advances and retracts by an amount of manual rotation of the rotary handle 15. Thus, the rotary handle 15 provides the user with intuitive and easy-to-use operability.

With a fine lead of the moving screw 285, a fine adjustment of approximately 0.5 mm per rotation can be performed. Although suitable for fine adjustment, the fine pitch has a disadvantage. Specifically, to move the form measurer 11 substantially, a motor command needs to be entered on the PC or remote controller again, thus somewhat complicating work. Since fine movement and rough movement are often repeated for position adjustment, operability is expected to be further improved.

Figure 11:
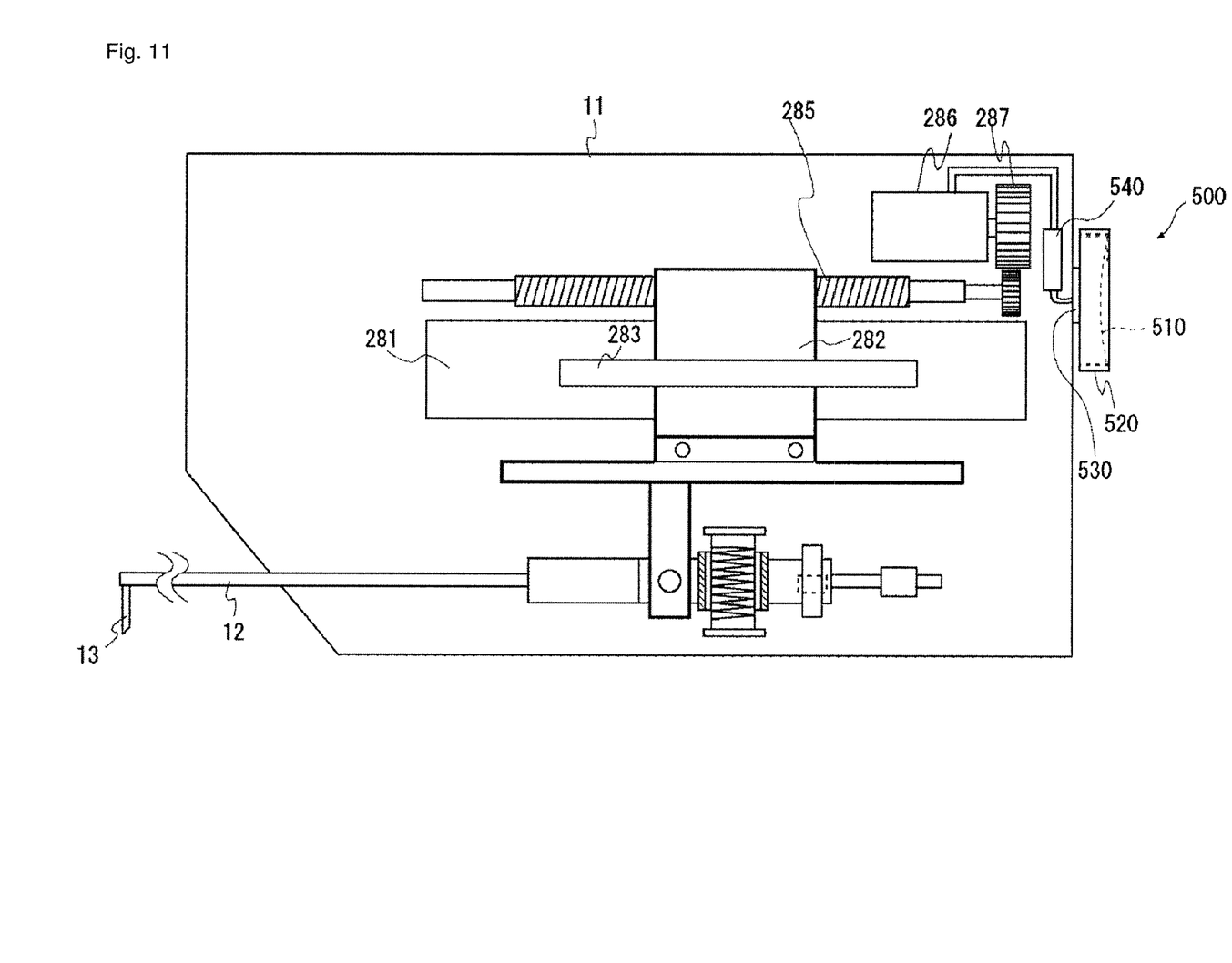
FIG. 11 illustrates a form measurer having a rotary switch instead of a rotation handle.
Figure 12:
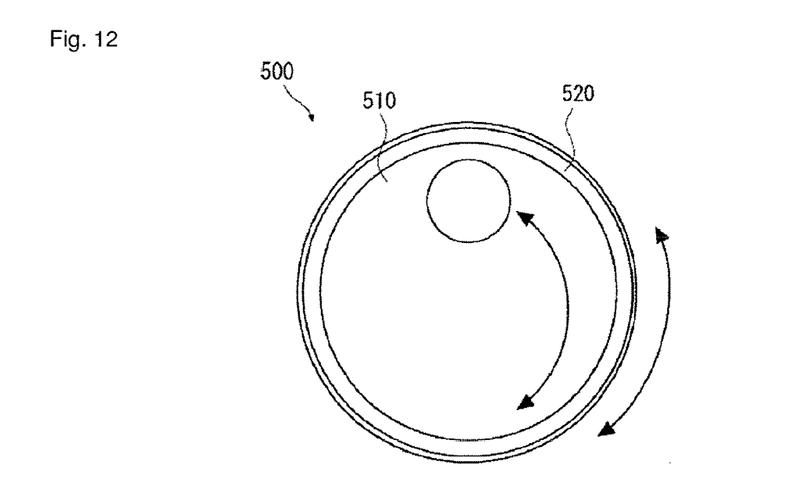
FIG. 12 illustrates the rotary switch.

In view of the above, a rotary switch 500 is employed, as shown in FIG. 11, the rotary switch 500 achieving fine moving and rough moving with similar operability to manual operation. The rotary switch 500 is provided in a position so as to replace the rotary handle 15 above. With reference to FIG. 12, the rotary switch 500 has a double structure, in which an inner circular switch 510 and an annular switch 520 are provided, the annular switch 520 being provided external to the circular switch 510. The inner circular switch 510 is referred to as a jog 510, and the annular switch 520 is referred to as a shuttle 520.

The jog 510 and the shuttle 520 are rotatable independently from each other. Each rotation is detected by a rotary encoder 530 (two rotary encoders 530 are provided independently for the jog 510 and the shuttle 520 respectively). A detection signal from the rotary encoder 530 is supplied to a control chip 540, which outputs a motor drive pulse associated with the detection signal.

A biasing force is applied to the shuttle 520 such that the shuttle 520 is returned to a predetermined position when released from the hand. The rotation of the shuttle 520 is detected by the rotary encoder and is output to the control chip 540. The control chip 540 supplies, to the motor 286, a drive signal associated with a rotation amount from the predetermined position, specifically, a rotation angle from the predetermined position. The drive signal associated with the size of the rotation angle may be an increase or decrease of a voltage level in response to the rotation angle. With PWM employed, a pulse width may be modulated in association with the rotation angle. That is, speed of movement of the measuring arm 12 is faster or slower in response to the rotation angle of the shuttle 520.

No biasing force is applied to the jog 510, nor is a predetermined position defined. The rotation of the jog 510 is also detected by the rotary encoder 530 and is output to the control chip 540. For example, the control chip 540 outputs one motor pulse per unit rotation angle of the jog 510. When the user rotates the jog 510 by one degree, for example, one motor pulse is output. That is, the measuring arm 12 advances and retracts by the angle for which the jog 510 is rotated. This is proximate to an operation feeling of manually rotating the rotary handle 15.

The rotary switch 500 provides excellent, intuitive, and easy-to-use operability that enables fine movement and rough movement in a simple manner.

The present invention is not limited to the embodiments above and may be modified within a range not deviating from the scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A moving mechanism comprising:
   a drive shaft rotatable about an axis; and
   a traction nut configured to hold the drive shaft therein and extending in a direction orthogonal to the axis of the drive shaft, wherein the traction nut is configured to switch between a friction-contact state of being in friction-contact with the drive shaft and a disengaged state of being disengaged from the drive shaft, the traction nut comprising:
      twist rollers pivotally supported so as to be rotatable in a state of defining an inclination angle with respect to the axis of the drive shaft, the inclination angle being equivalent to a lead angle,
      an open/close lever configured to switch between the friction-contact state and the disengaged state of the traction nut, and
      a biasing tool configured to generate a biasing force such that the traction nut is brought into friction-contact with the drive shaft, wherein:
         when the drive shaft is rotated in a state where the traction nut is in friction-contact with the drive shaft, the traction nut precisely moves along the drive shaft depending on the lead angle,
         in a state where the traction nut is disengaged from the drive shaft, the traction nut freely and roughly moves along the drive shaft, the rough movement being less precise than the precise movement,
         the open/close lever is configured to place the traction nut in the disengaged state against the biasing force of the biasing tool, in response to user operation, and
         the traction nut returns to the friction-contact state due to the biasing force of the biasing tool, when the user releases the open/close lever.

2. The moving mechanism according to claim 1, wherein the traction nut further comprises:
   a stationary piece; and
   a movable piece, wherein:
   the stationary piece and movable piece are opposite each other with the drive shaft therebetween,
   first ends of the stationary piece and the movable piece are connected so as to be elastically deformable,
   a second end of the movable piece is biased by the biasing tool so as to approach the stationary piece,
   the open/close lever is pivotally supported so as to be swingable by the stationary piece, and
   the open/close lever has a push pin on a fore end thereof, the push pin configured to press the second end of the movable piece in a direction away from the stationary piece.

3. The moving mechanism according to claim 1, wherein the traction nut further comprises:
   a handle extending in the direction generally orthogonal to the axis of the drive shaft and being fixed relative to the traction nut,
   the open/close lever and the handle are proximate to and parallel with each other,
   when the user grasps the handle, the open/close lever is concurrently grasped, and
   when the user releases the handle, the open/close lever is concurrently released from a hand of the user.

4. The moving mechanism according to claim 3, wherein the handle has a groove configured to receive the open/close lever.

5. The moving mechanism according to claim 1, wherein the drive shaft extends in an up/down direction and the traction nut advances and retracts in the up/down direction along the drive shaft.

6. A form measuring apparatus comprising:
   a moving mechanism comprising:
      a drive shaft rotatable about an axis; and
      a traction nut configured to hold the drive shaft therein and extending in a direction orthogonal to the axis of the drive shaft, wherein the traction nut is configured to switch between a friction-contact state of being in friction-contact with the drive shaft and a disengaged state of being disengaged from the drive shaft, the traction nut comprising:
         twist rollers pivotally supported so as to be rotatable in a state of defining an inclination angle with respect to the axis of the drive shaft, the inclination angle being equivalent to a lead angle,
         an open/close lever configured to switch between the friction-contact state and the disengaged state of the traction nut, and
         a biasing tool configured to generate a biasing force such that the traction nut is brought into friction-contact with the drive shaft, wherein:
            when the drive shaft is rotated in a state where the traction nut is in friction-contact with the drive shaft, the traction nut precisely moves along the drive shaft depending on the lead angle,
            in a state where the traction nut is disengaged from the drive shaft, the traction nut freely and roughly moves along the drive shaft, the rough movement being less precise than the precise movement,
            the open/close lever is configured to place the traction nut in the disengaged state against the biasing force of the biasing tool, in response to user operation, and
            the traction nut returns to the friction-contact state due to the biasing force of the biasing tool, when the user releases the open/close lever; and
   a form measurer connected to the traction nut.

* * * * *